United States Patent
Mitzenheim

(10) Patent No.: US 6,736,255 B1
(45) Date of Patent: May 18, 2004

(54) CONVEYOR SYSTEM FOR FEEDING SMALL PARTS TO A CHAIN ASSEMBLY UNIT

(75) Inventor: Heinz Mitzenheim, München (DE)

(73) Assignee: Joh. Winklhofer & Söhne GmbH & Co. KG, Munich (DE)

( * ) Notice: Subject to any disclaimer, the term of this patent is extended or adjusted under 35 U.S.C. 154(b) by 0 days.

(21) Appl. No.: 09/926,276

(22) PCT Filed: Mar. 17, 2000

(86) PCT No.: PCT/EP00/02402

§ 371 (c)(1),
(2), (4) Date: Feb. 4, 2002

(87) PCT Pub. No.: WO00/59809

PCT Pub. Date: Oct. 12, 2000

(30) Foreign Application Priority Data

Apr. 6, 1999 (DE) .......................................... 199 15 443

(51) Int. Cl.⁷ .............................................. B65G 47/12
(52) U.S. Cl. .................. 198/447; 198/397.02; 198/455
(58) Field of Search ................................ 198/447–451, 198/452, 397.02, 397.03, 455

(56) References Cited

U.S. PATENT DOCUMENTS

| | | | | |
|---|---|---|---|---|
| 2,373,623 A | * | 4/1945 | Yost ............................ | 198/383 |
| 2,459,264 A | * | 1/1949 | Cerruti ......................... | 198/447 |
| 2,678,124 A | * | 5/1954 | Bergmann ................... | 198/444 |
| 2,781,885 A | * | 2/1957 | Taylor .......................... | 198/389 |
| 3,372,790 A | * | 3/1968 | Pembroke .............. | 198/397.02 |
| 3,554,372 A | | 1/1971 | Gutman | |
| 3,575,713 A | * | 4/1971 | Duff et al. ..................... | 134/23 |
| 3,739,901 A | * | 6/1973 | Crispe ......................... | 198/452 |
| 4,635,784 A | | 1/1987 | Bourgeois | |
| 5,760,343 A | * | 6/1998 | Arimoto et al. ......... | 177/25.18 |
| 6,206,174 B1 | * | 3/2001 | Koltz .......................... | 198/444 |

* cited by examiner

Primary Examiner—Richard Ridley
(74) Attorney, Agent, or Firm—Armstrong, Kratz, Quintos, Hanson & Brooks, LLP

(57) ABSTRACT

It is the intention to improve a conveyor system for supplying small parts to a chain assembling unit, the system comprising a track system transporting the small parts, and a feed device loading the track system with the small parts. To this end the track system comprises at least two loading tracks which are loadable by the feed device with small parts, and at least one feed track which passes the small parts onwards to the chain assembling unit and communicates with at least one corresponding loading track, the number of the feed tracks being smaller than the number of the loading tracks, and the at least one feed track being selectively connectable to at least one other corresponding loading track for conveying the small parts.

30 Claims, 5 Drawing Sheets

CONVEYOR SYSTEM FOR FEEDING SMALL PARTS TO A CHAIN ASSEMBLY UNIT

The present invention relates to a conveyor system for supplying small parts to a chain assembling unit, the system comprising a track system transporting the small parts, and a feed device loading the track system with the small parts.

One decisive factor regarding the producible number of chain members in a chain assembling unit considerably depends on the capacity of the conveyor or feed devices. These conveyor devices must supply workpieces, in particular small chain parts such as bolts, sleeves or plates, etc., in adequate quantities for the joining operation. For a smooth joining operation, the conveyor system must have a high availability. To achieve such an availability, the prior art has suggested various. possible solutions, e.g. a redundant use of feed devices, a complete separation of the functions storing, conveying, organizing the joining process by presorting the components, etc. A presently preferred device in the field of chain assembly is a vibration type spiral conveyor which is particularly suited for supplying sleeves and bolts. However, these systems have also their limits, especially when a diameter ratio between 1 and 1.5 prevails in the transportation of cylindrical components. With such dimensions the components tend to get jammed in the baffles, increasingly resulting in disturbances. Numbers of pieces of more than 350 pieces/min are presently standard in the assembly of chains. However, the limiting factor in this system is most of the time the conveyor system, for recently developed joining methods could be carried out at a much higher number of pieces.

It is therefore the object of the present invention to provide a conveyor system which while being of a simple and inexpensive construction provides for a high availability of small parts.

This object is achieved according to the invention in that the track system comprises at least two loading tracks which can be loaded by the feed device with small parts, and at least one feed track which passes the small parts onwards to the chain assembling unit and communicates with at least one corresponding loading track, the number of the feed tracks being smaller than the number of the loading tracks, and the at least one feed track being selectively connectable to at least one other corresponding loading track for conveying the small parts.

This means that the feed device has e.g. twice the number of loading tracks, whereas only specific loading tracks communicate with a corresponding feed track. The feed track can be switched over or connected to another loading track under the most different circumstances and needs. In the event of disturbances in a loading track communicating with the feed track, another loading track is switched to. The disturbance in the now uncoupled loading track can then be remedied independently of the flow of material. Thus the loading tracks not participating in the conveying action at the moment serve as a buffer which will take part in the conveying operation through a corresponding connection to the feed track, e.g. in the event of disturbance or by a deliberate switching action performed by the user. At the same time, the feed device then performs again the continuous filling of the loading track. The question with which loading track a feed track is communicating at the moment may depend on many criteria, and the connection may be controlled manually or automatically. The connection of the loading tracks to the feed tracks, as well as the closing of the loading tracks not communicating with the feed tracks at the moment can be controlled in many ways.

Such a construction is also possible within a very confined constructional space, and only one loading-track length is needed for maintaining or ensuring a safe loading as well as an adequate availability in the case of a switching of the feed track.

Preferably, a shunt device may be provided between the loading tracks and the feed tracks for selectively connecting at least one specific loading track to at least one specific feed track. The shunt device must be designed such that it prevents a further outflow from the currently connected loading track or just waits until the same has been completed entirely, and then passes to another loading track. Such shunt devices may be of a very simple construction; that is why they can work very precisely and very rapidly. Consequently, even at a very fast conveying rate an exact switching operation is possible.

Although other assignments are feasible, the conveyor system can best be simplified according to one variant in that the number of the loading tracks is a multiple of the number of the feed tracks which can be divided by the number 2. It can thereby be ensured that switching, displacement or other paths that are as short as possible ensure a reliable reaction e.g. in the event of a disturbance.

It is thereby possible to position the respectively alternating tracks directly side by side without the arrangement of a further track thereinbetween.

To obtain reliable information as to when a feed track must be connected to another loading track, a monitoring device may be provided for monitoring the loading of the loading track and for supplying signals for a troublefree assignment of loading tracks and feed tracks. In the simplest case it can be checked whether a transportation flow is still maintained at the place of connection between loading track and feed track. As soon as small parts no longer pass through the place of connection, the feed track is changed to a preferred neighboring loading track. It may also be checked whether foreign matter, damaged parts or incorrectly positioned parts are located in the loading track. The signal supplied by the monitoring device can then be used via a corresponding processing unit as a control signal for an automatic change to another loading track.

In an advantageous embodiment, the shunt device comprises a channel system the inlets of which communicate with a respective loading track and whose at least one outlet communicates with a respective feed track, at least two inlet channels meeting each other at at least one channel crossing and being continued as a joint outlet channel. Thus the shunt device comprises a predetermined channel system by which the small parts are automatically guided in dependence upon the respectively connected loading track. Additional shunt elements will then provide for a corresponding transportation of the small parts. This can e.g. be carried out in that the shunt device comprises slider elements which for disabling or enabling an inlet channel and/or a loading track can be moved into or removed from said channel and/or track. Depending on the size of the small parts, pins or bolts of a simple design are also possible in this instance. These slider elements can be moved into an associated track or an associated channel at a specific angle or by reason of their shape such that a clamping action that is as great as possible is achieved if a small part is positioned in the displacement path of the slider element. As a result, the slider element must not exactly impinge within the gap between the small parts.

For reasons of safety each channel crossing of the shunt device may have assigned thereto a slider element for blocking or releasing the feeding channel. As a result, monitoring devices for monitoring the release of a channel crossing can be dispensed with, for it must be ensured that small parts are not supplied by both feeding channels at a channel crossing at the same time. This might cause a jam as well as an interruption of the material flow.

In particular, a control device may be provided for controlling the shunt device in dependence upon the monitoring signal of the monitoring device. For reasons of wear such a control device could also permit a manual switching operation, so that, if possible, all of the loading tracks are evenly used.

Furthermore, the control device may be designed such that the connection of a loading track to a feed track will only be released if the at least one associated channel crossing of the shunt device is free from chain parts. The control device switches the shunt device either at the right time or with the help of additional elements in such a way that a collision is prevented in the area of the channel crossing.

The small parts can be conveyed in the loading tracks and the feed tracks in the most different ways. Although according to one embodiment a transportation by gravity is preferred for reasons of costs, a forced guidance by means of vibration or compressed air, etc. is also possible. With such a forced transportation the throughput could even be increased considerably. Of importance is above all that a continuous transportation is ensured by the design of the loading tracks and the feed tracks.

To convey a sufficient number of small parts onto the loading tracks, it has been found that a rotating conveying pot with internally arranged blades is in particular suited as a feed device, said pot conveying the small parts into that section of the loading tracks that is upwardly open at least in the front area. The loading tracks are then preferably arranged with their front portion in the area of the rotational axis within the conveying pot such that the small parts are conveyed into the loading tracks by means of the blades. Such a conveying pot has a much higher output than formerly used vibration conveyors and is extremely robust in addition. This means that it is insensitive to soiled parts and that foreign matter does not lead to a failure of the conveying pot. The conveying pot may also be equipped with sieves or sieve walls so that undesired small parts or dirt are removed automatically. Furthermore, any desired number of loading tracks may be arranged in parallel that are loadable with a sufficient number of small parts. Since insensitive small parts are most of the time used in the field of chain assembly, such a conveying pot is excellently suited for ensuring an extremely high availability.

Furthermore, a stripper element, in particular a stripper roller and/or slider, may be provided which in cooperation with the conveying pot is assigned to the front area of the loading tracks, with incorrectly oriented small parts being stripped off or slid in a correct orientation into the loading tracks. Thus, the stripper element supports the correct positioning of the small parts in the loading tracks; in particular, upright small parts should be turned over by such a stripper element.

A further simplification is achieved in that the loading tracks and/or the component comprising the channel system of the shunt device are designed as upwardly open groove tracks in a substantially joint basic body.

Embodiments of the present invention shall now be explained in more detail with reference to drawings, in which.

Figure 1:
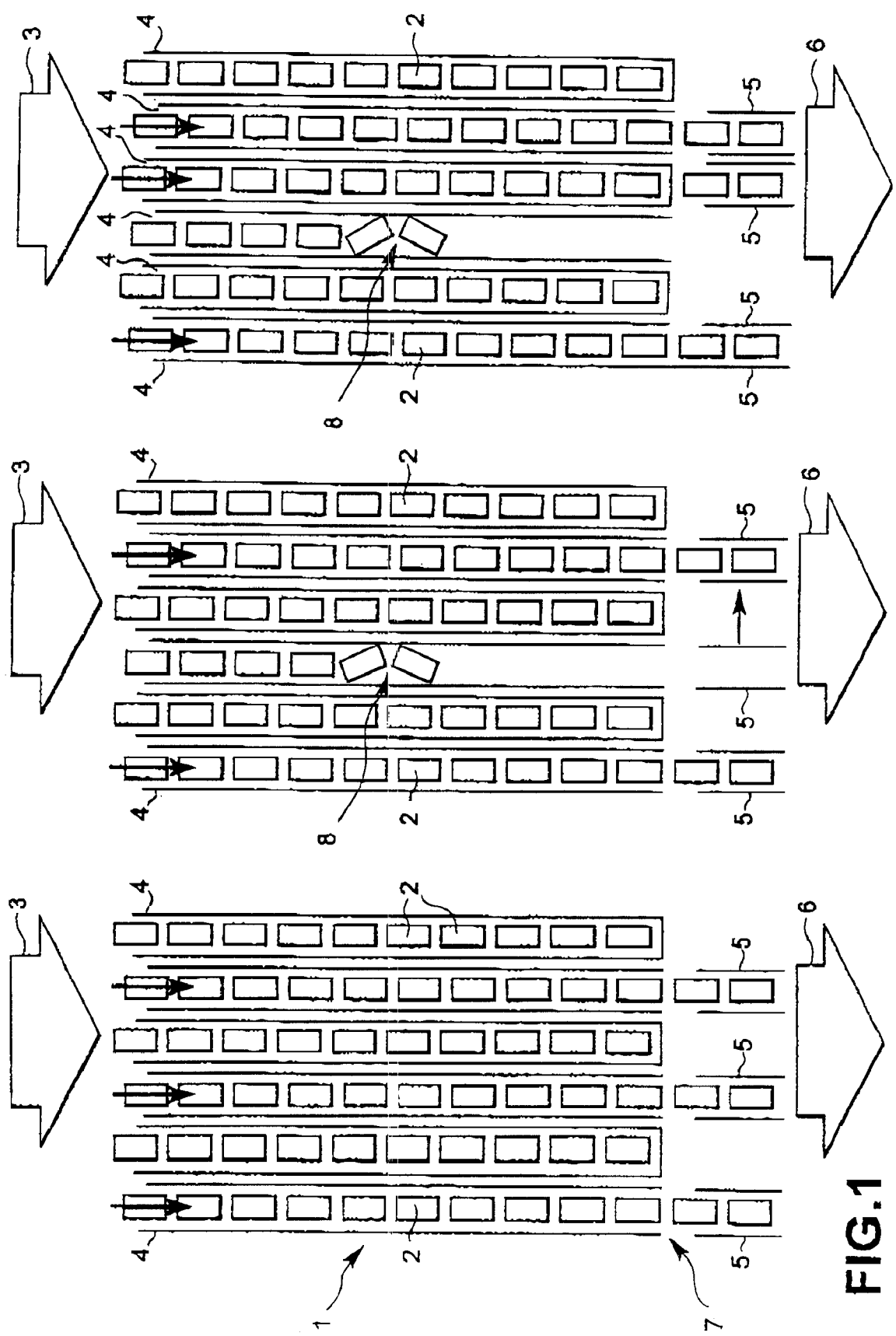
FIG. 1 is a schematic illustration of a track system of a conveyor system, showing the switching operation in three stages in the event of a disturbance.

The left side of FIG. 1 shows a track system 1 which operates in a troublefree way and is suited for transporting small parts 2, in the present case articulated sleeves for chains. The track system 1 is continuously fed with small parts 2 via a feed device 3 (not shown in more detail in FIG. 1). The feed device 3 ensures that the small parts 2 are introduced in a correct position into the track system 1. In the illustrated embodiment, the track system comprises six loading tracks 4 which are each loaded by the feed device 3 with small parts 2. The loading tracks 4 may be any suitable track-type guiding system, such as rails guides, closed channels (e.g. hollow sections), or the like. Preferably, the loading tracks 4 are inclined downwards so that the small parts 2 are conveyed by gravity. It is thereby ensured that small parts 2 can always be reloaded.

Furthermore, the track system 1 comprises three feed tracks 5 which feed the small parts 2 to a joining head 6 (not shown in more detail) of a chain assembling unit. Each feed track 5 has assigned thereto two loading tracks 4. The first feed track 5 is assigned to the first and second loading tracks 4 (from the left to the right), the second feed track 5 to the third and fourth loading track 4, and the third feed track 5 to the fifth and sixth loading track 4. Other assignments may be suitably employed. In particular, more than two loading tracks 4 can be assigned to one feed track 5. This means that the feed tracks 5 in the connection area 7 can be communicated with another corresponding loading track 4. In the left illustration of FIG. 1, the first feed track 5 is connected to the first loading track, the second feed track 5 to the third loading track 4, and the third feed track 5 to the fifth loading track 4. Each of the second, fourth and sixth loading tracks 4 serves as a buffer. The feed device is designed such that said buffers are always kept in a fully filled state, but once they have been filled completely, it is not possible to convey further small parts 2 thereinto.

Corresponding shut-off devices (not shown in more detail) will then ensure that the loading tracks that serve as buffers are closed at the end facing the connection area 7.

The left illustration of FIG. 1 now shows the initial state for conveying small parts 2. If, as shown in the central illustration of FIG. 1, there is a disturbance or disorder in one of the loading tracks 4 (in the instant case the third loading track 4), the flow of conveyed parts is interrupted at said place, and the second feed track 5 is no longer supplied with small parts 2. To prevent a situation in the second feed track 5 where the mounting operation is impaired by an interruption in the flow of conveyed parts, a safety means is now installed. Sensors (not shown in more detail) sense the disruption of the flow of conveyed parts in the connection area 7, or at any other suitable place, and start a switching operation. Reference numeral 8 marks the place of disruption in the third loading track 4 caused by a jamming of sleeves 2. The end of the second feed track 5 which faces the connection area 7 is now switched from the third loading track 4 to the fourth loading track 5. At the same time, the end of the fourth loading track 4 which faces the connection area 7 is opened, so that small parts 2 can instantaneously be conveyed from the fourth loading track 4 into the second feed track 5. This operation takes place at such a fast pace that the flow of small parts is not interrupted at the joining head 6. To this end the feed device 3 must additionally be capable of conveying small parts 2 at a faster speed to the loading track 4 than the speed at which they are discharged in the area of the joining head.

When the apparatus is now in the position that is the right one in FIG. 1, the disorder in the third loading track 4 can be eliminated.

To ensure a reliable function of this schematically illustrated mechanism, precautions must be taken which permit both a swift and neat loading of the loading tracks 4 and an adequate monitoring, e.g. by sensors which immediately sense a disturbance. Furthermore, a mechanism must be provided in the connection area 7, for instance a shunt mechanism which permits a neat and troublefree connection of the feed tracks 5 to the loading tracks 4, in particular during a switching operation. These functions can be fulfilled by a plurality of different mechanisms. Exemplary configurations shall be described in the following.

Figure 2:
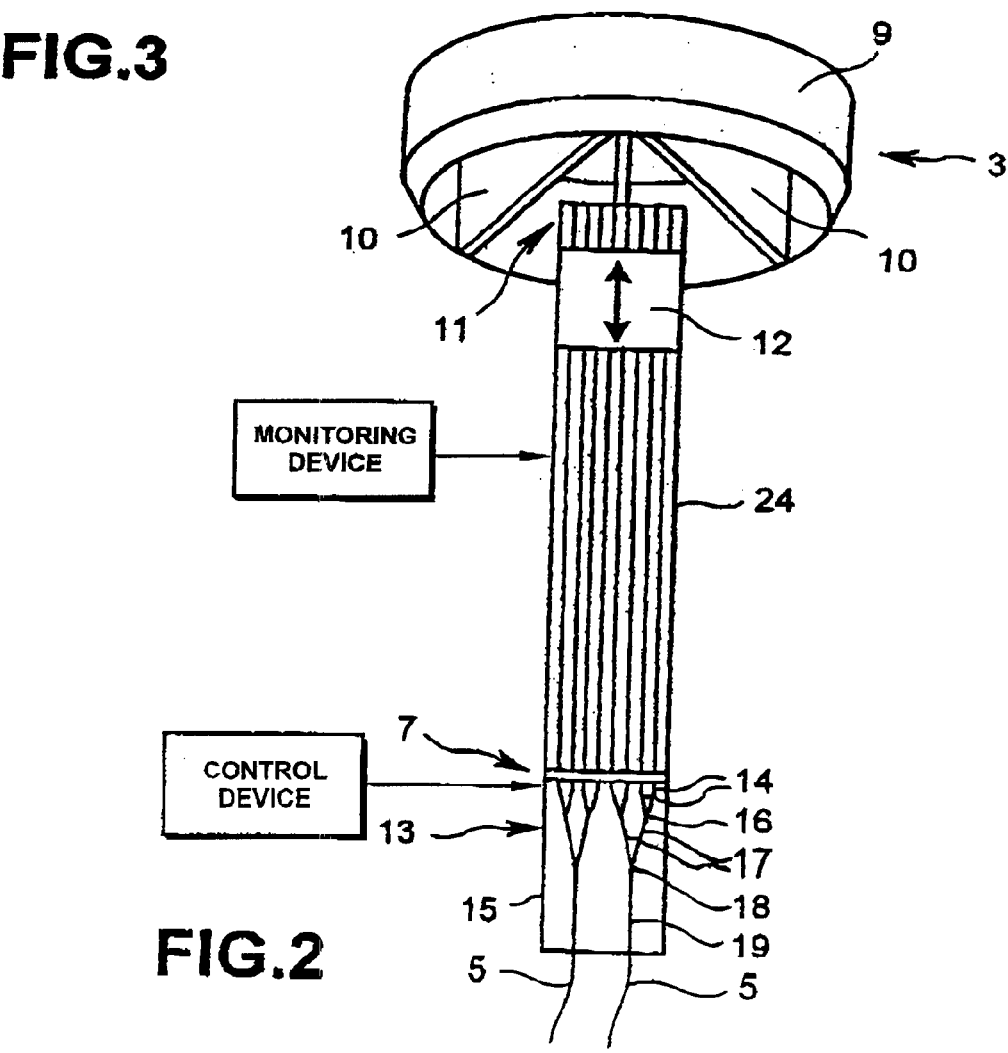
FIG. 2 is a schematic top view on a further embodiment of a conveyor system.

According to FIG. 2 a rotating pot 9 which rotates about an axis is used as the feed device 3. Such rotating pots 9 comprise internally arranged baffles 10 and are able to supply large quantities of small parts 2 on a plurality of conveyor tracks. The small parts 2 are arranged in the interior of the rotating pot 9 and are conveyed by the baffles 10 to the front area 11 of the loading tracks 4 by way of entrainment. This front area 11 of the loading tracks 4 is upwardly open, so that the small parts 2 can penetrate into the individual loading tracks 4 by being just thrown onto said area 11. A reciprocating stripper or slider 12 will then ensure that the small parts 2 are arranged in a correct position in the tracks 4 and that excessive small parts will fall back into the rotating pot 9. Since all of the loading tracks 4 are upwardly open, all loading tracks 4, in the instant case eight loading tracks 4, are supplied with small parts 2. The width of the loading tracks 4 is normally smaller than the length of the small parts. The loading tracks 4 which are serving as buffers do not present any obstacles because due to the fact that they are filled completely they can no longer receive any additional small parts 2, with the slider 12 wiping off again any excessive small parts 2.

Figure 6:
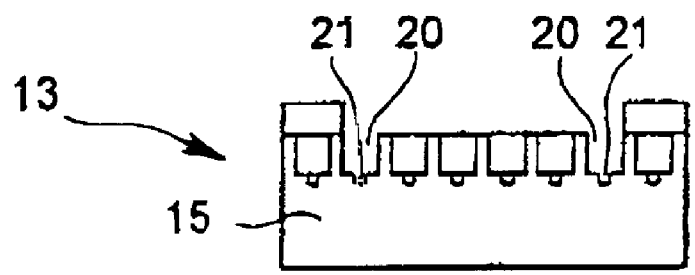
FIG. 6 is a front view of the shunt rail of FIG. 5.
Figure 5:
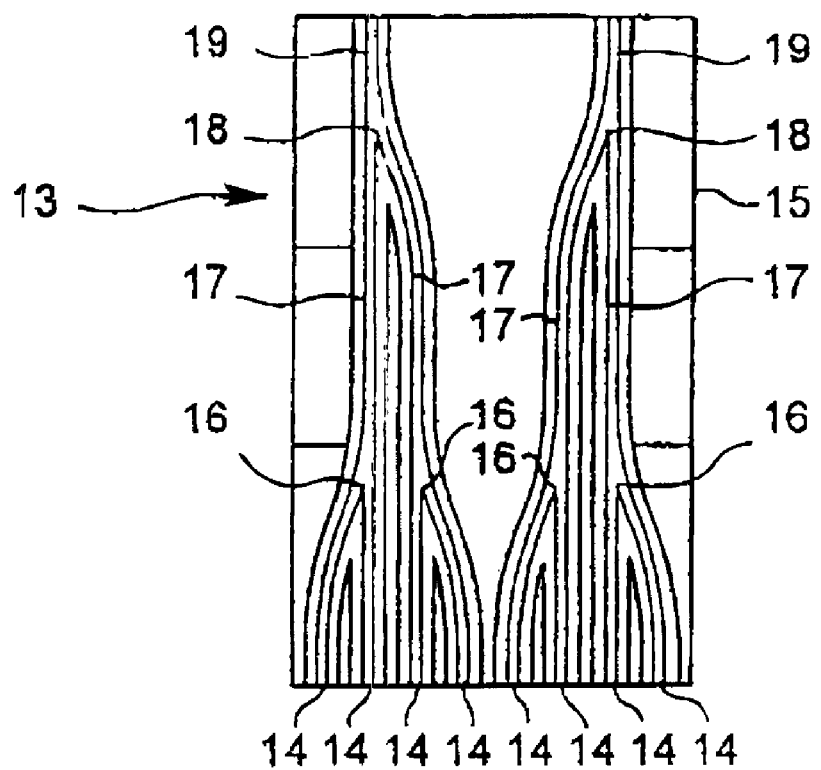
FIG. 5 is a top view on an embodiment of a shunt rail.

In the present case the small parts 2 are also conveyed into the loading tracks 4 by gravity due to the fact that the loading tracks 4 extend obliquely downwards. The gradient of the inclination has here been chosen such that there is an adequate conveying speed and that the flow of small parts is never interrupted at the joining head 6. A forced transportation of the small parts 2 may also be provided for, e.g. by way of vibration or compressed-air transportation. The connection area 7 is followed in the instant case by a shunt device 13. The shunt device 13 comprises a channel system which includes eight inlets 14, each of said inlets 14 communicating with the end of one of the loading tracks 4. FIGS. 5 and 6 illustrate the basic body 15 of the shunt device 13 which carries the channel system. Two respective inlet channels 14 are combined at a channel crossing 16 to form a joint intermediate channel 17. These intermediate channels 17, in turn, are combined at a joint second channel crossing 18 to form a joint outlet channel 19. The outlet channels 19 then communicate again with a corresponding feed track 5.

This means that each feed track 5 communicates with four loading tracks 4. This offers a number of conveying possibilities which require a corresponding control and monitoring of the shunt device 13. Of prime importance is here that only one respective small part 2 passes into the area of a channel crossing 16 or 18 so that no jamming takes place at said point. This means that only a single one of the channel sections leading to one of the channel crossings 16 or 18 can communicate with the channel section leading away therefrom. This connection, however, may also alternate as long as a troublefree transportation is ensured in the crossing area. In an extreme case this means for the variant shown in FIG. 2 and FIGS. 5 and 6 that each feed track 5 has assigned thereto three loading tracks 4 serving as buffers. Each of the loading tracks 4 must thus be able to ensure an adequate supply of small parts to the feed track 5. As soon as some disturbance arises in one of the loading tracks 4, another loading track 4 is switched to in accordance with a shunt adjustment. This switching operation may also take place batchwise. As soon as e.g. one of the loading tracks 4 serving as a buffer has been filled again entirely, said track can be connected to a feed track 5, so that the whole contents can be conveyed as fast as possible into the feed track 5. This operation can then be carried out at a faster speed than the supply of the small parts 2 to the individual loading tracks 4. This process can easily be maintained with the help of four cooperating loading tracks 4–also in the event of disturbance.

As can be seen in FIG. 6, the channels in the basic body 15 are upwardly open grooves 20 of a rectangular cross-section. The grooves 20 may additionally be provided at their base with a small longitudinal groove 21 which serves e.g. to receive dirt particles.

Figure 3:
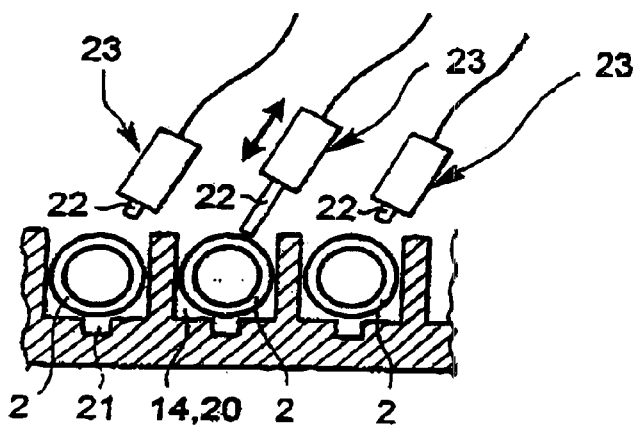
FIG. 3 is a schematic cross-sectional representation of the track system with further elements.

FIG. 3 now illustrates one possibility of disabling or enabling the loading tracks 4 and the shunt device 13, respectively. To this end slider elements 23 are used that are each provided with a plunger 22. These slider elements 23 may also be arranged in the tracks or grooves. This illustration only shows one of the possible variants. The plunger 22 of the slider element 23 can be retracted and extended. In the retracted state the slider element 23 releases the associated track or the associated channel, so that small parts 2 are conveyed therethrough. However, when the plunger 22 is extended, it either impinges in a gap between two small parts 2, thereby blocking the track or the channel, or the plunger 22 impinges on the small part 2 itself. The small part 2 is clamped by the plunger 22 because of the shape of the track or the channel. Preferably, the clamping force is applied by the plunger 22 obliquely from above, as shown in FIG. 3, resulting in an improved clamping action because the cylindrical small parts 2 are then pressed against both the side wall and the bottom wall of the track or the channel.

As becomes also apparent from FIG. 3, each of the tracks or channels has assigned thereto such a slider element 23. These slider elements 23 may be arranged at any desired place of the loading tracks 4, the shunt device 13 or the feed tracks 5. The simplest variant consists in that the slider elements 23 are assigned either to the lower end of the loading tracks 4 or the inlet channels 14 of the shunt device 13. Each of the loading tracks 4 can thereby be blocked or released. Corresponding monitoring devices or sensors can then detect each time whether the channel crossings 16 and 18, respectively, are released and it is only in cases where no small parts are found in this area twice that another loading track is enabled by means of the slider element 23. In a simple variant it is entirely sufficient to monitor the area of the channel crossing 18 with one sensor.

Corresponding disturbance sensors may also be arranged at any other place to detect any disturbance, e.g. a jamming of small parts 2 in the loading tracks 4, so that these signals can be processed by a control unit and said unit, in turn, transmits signals to the slider elements 23, so that a desired shunt adjustment and a connection of a predetermined loading track 4 with a feed track 5 are carried out.

If it is e.g. assumed in the case of this variant that one of the four cooperating loading tracks 4 serves as a substitute track in case of disturbance and that three loading tracks 4 can always be used, the conveying speed can be increased by one third over conventional single tracks with the same feed device 3. In addition, this system also ensures an adequate availability even in the event of disturbance.

Figure 4:
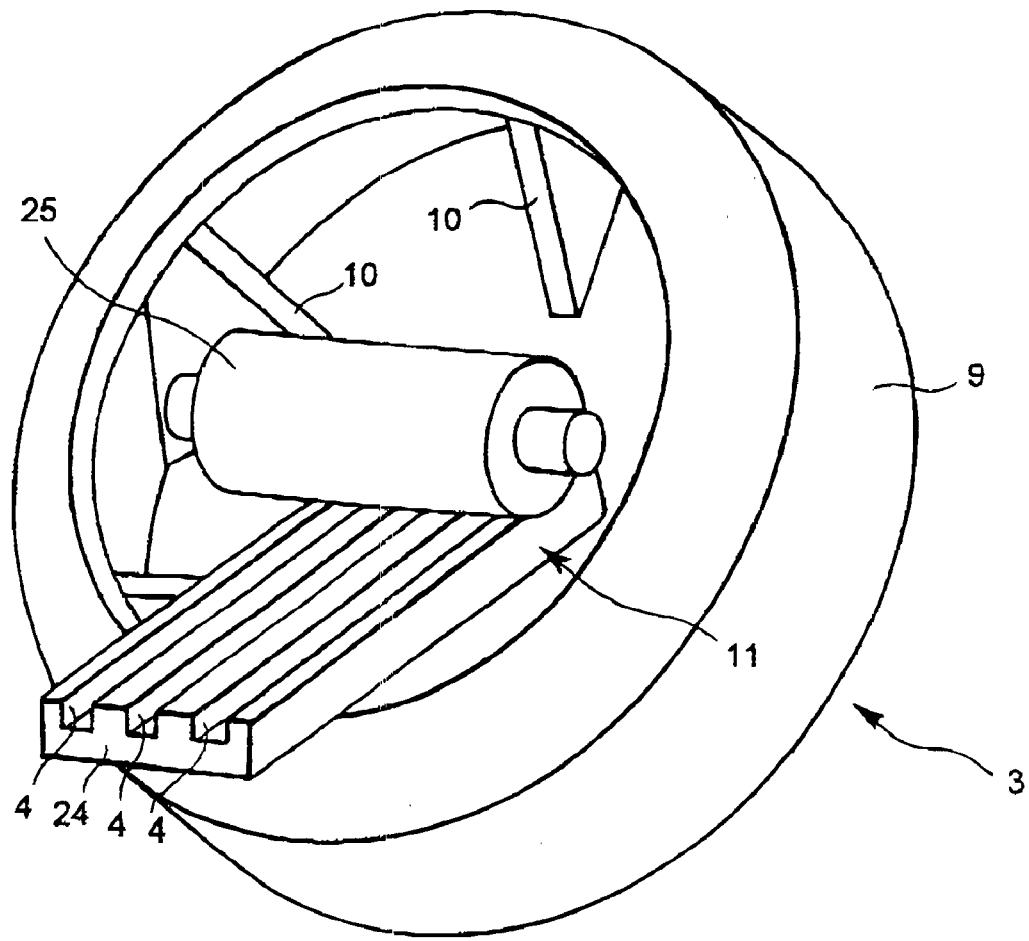
FIG. 4 is a perspective representation of a rotating pot as a feed device to the track system.

FIG. 4 shows a further variant of a feed device 3 with a rotating pot 9. The rotating pot 9 is slightly inclined rearwards, so that its axis of rotation is oriented obliquely upwards. In this instance, too, the baffles 10 ensure that the small parts 2 located in the rotating head 9 are conveyed upwards. These will then fall from the baffles 10 onto the front area 11 of the loading tracks 4. These are formed in the present case in a joint basic body 24 as upwardly open grooved tracks. In the present case three loading tracks 4 are provided for. In this variant, a stripper roller 25 serves as a stripper element which ensures that the small parts 2 are safely received in the loading tracks 4. As can also be seen very clearly, the loading tracks 4 are guided away obliquely downwards approximately from a point of intersection with the axis of rotation of the rotating pot 9, so that a transportation by gravitational force takes place. Depending on the steepness of the inclination, the conveying speed can be defined in the loading tracks 4.

Figure 8:
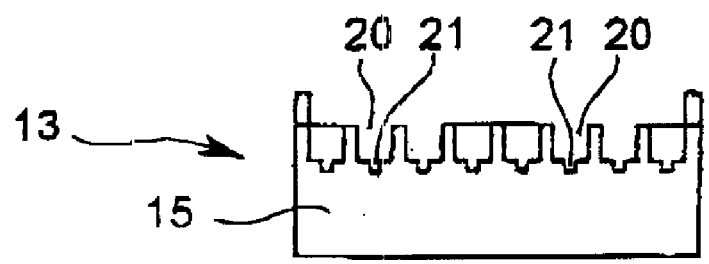
FIG. 8 is a front view on the shunt rail of FIG. 7.
Figure 7:
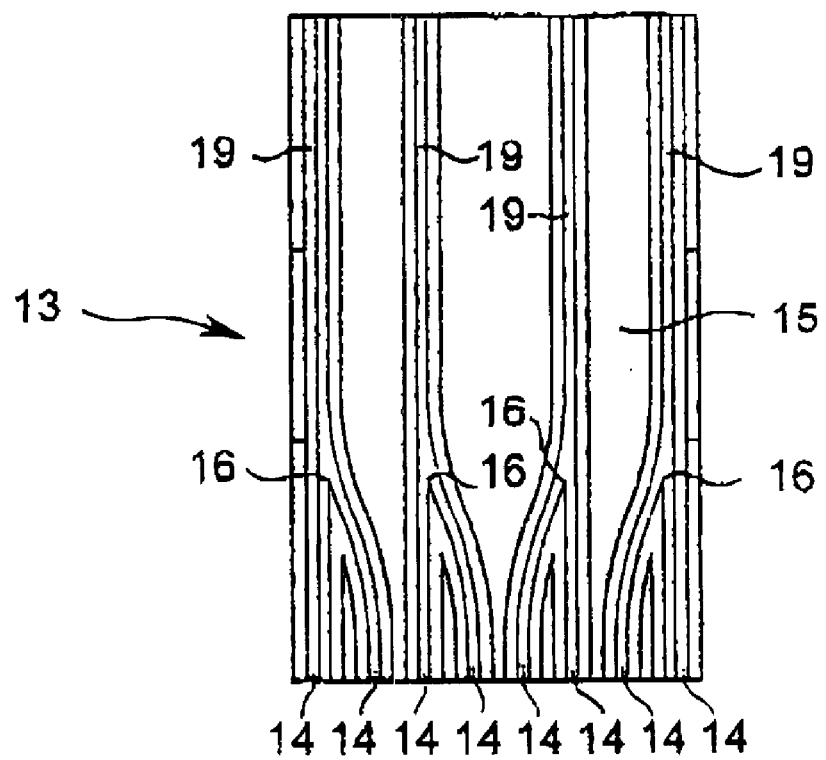
FIG. 7 is a top view on a further embodiment of a shunt rail.

FIGS. 7 and 8 show a further variant of the basic body 15 of a shunt device 13. The basic body is again equipped with eight inlet channels 14. In this instance, however, only two inlet channels 14 are connected via the channel crossing 16 to an outlet channel 19. It is thus possible to operate four feed tracks 5. Since each feed track 5 has assigned thereto two loading tracks 4, an adequate reliability and a permanent availability of small parts can again be ensured by way of a corresponding control. Monitoring devices, such as sensors, monitor the channel crossing 16 again to prevent any accumulation caused by jamming in the shunt device 13. Suitable shunt elements, such as the slider elements 23 shown in FIG. 3, will then ensure a corresponding enabling operation or connection of specific loading tracks 4 to the associated feed tracks 5.

The cross section of the grooves 20 can be seen in FIG. 8.

Depending on the selected variant, it is possible to improve not only the reliability when small parts are fed to a chain assembling unit, but the conveying speed can also be increased, if necessary. Moreover, the use of a rotating feed device makes it possible to load loading tracks with a much higher number of pieces than is possible with feed devices that have so far been used in this technical field. As becomes apparent from the above-described embodiments, the switching between the individual loading tracks 4 and the feed tracks 5 can be carried out in different ways, e.g. by displacing the feed tracks 5 relative to the loading tracks 4, or vice versa, by using shut-off elements (e.g. slider elements 23) or other shunt systems.

What is claimed is:

1. A conveyor system for feeding parts (2) to a chain assembling unit, comprising a track system (1) transporting said parts (2), and a feed device (3) loading said track system (1) with said parts (2), said track system (1) comprising at least two loading tracks (4) which are loadable by said feed device (3) with parts (2), and feed tracks (5) which pass said parts (2) onwards to said chain assembling unit and communicate with at least one corresponding loading track (4), the number of said feed tracks (5) being smaller than the number of said loading tracks (4), and at least one of said feed tracks (5) being selectively connectable to at least one other corresponding loading track (4) for conveying said parts (2), and a shunt device (13) being provided between said loading tracks (4) and said feed tracks (5) for selectively connecting at least one specific loading track (4) to at least one specific feed track (5), characterized in that said shunt device (13) comprises a channel system whose inlets (14) communicate with a respective loading track (4) and whose at least one outlet (19) communicates with a respective feed track (5), and that at least two inlet channels (14) meet each other at at least one channel crossing (16, 18) and are continued as a joint outlet channel (19), and the shunt device (13) has slider elements (23) which, for disabling or enabling an inlet channel (14) and/or a loading track (4), are movable into and removable from said channel and or track.

2. The conveyor system according to claim 1, characterized in that the number of said loading tracks (4) is a multiple of the number of said feed tracks (5), which number of feed tracks can be divided by the number 2.

3. The conveyor system according to any one of claims 1 to 2, characterized in that a monitoring device is provided which monitors the loading of said loading tracks (4) and which supplies signals for assignment of loading tracks (4) and feed tracks (5).

4. The conveyor system according to claim 1 or 2, characterized in that said at least one channel crossing (16, 18) of said shunt device (13) has assigned thereto a slider element (23) for disabling or enabling the associated channel (14, 17, 19).

5. The conveyor system according to claim 3, characterized in that a control device is provided for controlling said shunt device (13) in response to a monitoring signal from said monitoring device.

6. The conveyor system according to claim 5, characterized in that said control device is configured such that the connection of a loading track (4) to a feed track (5) will only be enabled if the least one associated channel crossing (16, 18) of said shunt device (13) is free from parts (2).

7. The conveyor system according to claim 1 or 2, characterized in that said loading tracks (4) and said feed tracks (5) are designed such that said parts (2) are conveyed by gravity.

8. The conveyor system according to claim 1 or 2, characterized in that said feed device (3) is formed by a rotating conveyor pot (9) with inwardly arranged blades (10) for conveying said parts (2) in a section of said loading tracks (4) having an upwardly open in the front area (11).

9. The conveyor system according to claim 8, characterized in that a striper element (12, 25), comprising a stripper roller and/or slider, is assigned to the front area (11) of said loading tracks (4) for stripping off an incorrectly oriented part (2) or for sliding said part into said loading track (4) with a correct orientation.

10. The conveyor system according to claim 1 or 2, characterized in that said loading tracks (4) and or a component (15) comprising the channel system of said shunt device (13) are designed as upwardly open groove tracks in a body.

11. A conveyor system for feeding parts (2) to a chain assembling unit, comprising a track system (1) transporting said parts (2), and a feed device (3) loading said track system (1) with said parts (2), said track system (1) comprising at least two loading tracks (4) which are loadable by said feed device (3) with parts (2), and feed tracks (5) which pass said parts (2) onwards to said chain assembling unit and communicate with at least one corresponding loading track (4), the number of said feed tracks (5) being smaller than the number of said loading tracks (4), and said feed tracks (5) being selectively connectable to at least one other corresponding loading track (4) for conveying said parts (2), and a shunt device (13) being provided between said loading tracks (4) and said feed tracks (5) for selectively connecting at least one specific loading track (4) to a specific at least one feed track (5), and a control device being provided for controlling said shunt device (13) in response to the monitoring signal from a monitoring device, characterized in that said control device is configured such that the connection of a loading track (4) to a feed track (5) will only be enabled if the at least one associated channel crossing (16, 18) of said shunt device (13) is free from parts (2), and the shunt device (13) has slider elements (23) comprising a plunger that, for disabling or enabling an inlet channel (14) and/or a loading track (4), are movable into and removable from said channel and or track.

12. The conveyor system according to claim 11, characterized in that the number of said loading tracks (4) is a multiple of the number of said feed tracks (5), which number of feed tracks can be divided by the number 2.

13. The conveyor system according to claim 11 or 12, characterized in that a monitoring device is provided which monitors the loading of said loading tracks (4) and which supplies said signal for assignment of loading tracks (4) and feed tracks (5).

14. The conveyor system according to claim 11 or 12, characterized in that said shunt device (13) comprises a channel system whose inlets (14) communicate with a respective loading track (4) and whose having at least one outlet (19) communicating with a respective feed track (5), and that at least two inlet channels (14) meet each other at at least one channel crossing (16, 18) and are continued as a joint outlet channel (19).

15. The conveyor system according to claim 11 or 12, characterized in that each channel crossing (16, 18) of said shunt device (13) has assigned thereto a slider element (23) for disabling or enabling the associated channel (14, 17, 19).

16. The conveyor system according to claim 11 or 12, characterized in that said loading tracks (4) and said feed tracks (5) are designed such that said parts (2) are conveyed by gravity.

17. The conveyor system according to claim 11 or 12, characterized in that said feed device (3) is formed by a rotating conveyor pot (9) with inwardly arranged blades (10) for conveying said parts (2) in that section of said loading tracks (4) that is at least upwardly open in the front area (11).

18. The conveyor system according to claim 17, characterized in that a stripper element (12, 25), comprising a stripper roller and/or slider, is assigned to the front area (11) of said loading tracks (4) for stripping off an incorrectly oriented part (2) or for sliding said small part into said loading track (4) with a correct orientation.

19. The conveyor system according to claim 14, characterized in that said loading tracks (4) and or a component (15) comprising the channel system of said shunt device (13) are designed as upwardly open groove tracks in substantially one joint body.

20. A conveyor system for feeding parts (2) to a chain assembling unit, comprising a track system (1) transporting said parts (2), and a feed device (3) loading said track system (1) with said parts (2), said track system (1) comprising at least two loading tracks (4) which are loadable by said feed device (3) with parts (2), and feed tracks (5) which pass said parts (2) onwards to said chain assembling unit and communicate with at least one corresponding loading track (4), the number of said feed tracks (5) being smaller than the number of said loading tracks (4), and said feed tracks (5) being selectively connectable to at least one other corresponding loading track (4) for conveying said parts (2), characterized in that said feed device (3) is formed by a rotating conveyor pot (9) with inwardly arranged blades (10) for conveying said parts (2) in that section of said loading tracks (4) having an upwardly open front area (11), and the shunt device (13) has slider elements (23) comprising a plunger that, for disabling or enabling an inlet channel (14) and/or a loading track (4), are movable into and removable from said channel and/or track.

21. The conveyor system according to claim 20, characterized in that a shunt device (13) is provided between said loading tracks (4) and said feed tracks (5) for selectively connecting at least one specific loading track (4) to at least one specific feed track (5).

22. The conveyor system according to claim 20 or 21, characterized in that the number of said loading tracks (4) is a multiple of the number of said feed tracks (5), which number of feed tracks can be divided by the number 2.

23. The conveyor system according to claim 20 or 21, characterized in that a monitoring device is provided which monitors the loading of said loading tracks (4) and which supplies signals for assignment of loading tracks (4) and feed tracks (5).

24. The conveyor system according to claim 21, characterized in that said shunt device (13) comprises a channel system whose inlets (14) communicate with a respective loading track (4) and whose at least one outlet (19) communicates with a respective feed track (5), and that at least two inlet channels (14) meet each other at at least one channel crossing (16, 18) and are continued as a joint outlet channel (19).

25. The conveyor system according to claim 24, characterized in that each channel crossing (16, 18) of said shunt device (13) has assigned thereto a slider element (23) comprising a plunger for disabling or enabling the associates channel (14, 17, 19).

26. The conveyor system according to claim 23, characterized in that a control device is provided for controlling said shunt device (13) in response to the monitoring signal from said monitoring device.

27. The conveyor system according to claim 26, characterized in that said control device is configured such that the connection of a loading track (4) to a feed track (5) will only be enabled if the at least one associated channel crossing (16, 18) of said shunt device (13) is free from parts (2).

28. The conveyor system according to claim 20 or 21, characterized in that said loading tracks (4) and said at least one feed track (5) are designed such that said parts (2) are conveyed by gravity.

29. The conveyor system according to claim 20 or 21, characterized in that a stripper element (12, 25), comprising a stripper roller and/or slider, is assigned to the front area (11) of said loading tracks (4) for stripping off an incorrectly oriented part (2) or for sliding said part into said loading track (4) with a correct orientation.

30. The conveyor system according to claim 24, characterized in that said loading tracks (4) and or a component (15) comprising the channel system of said shunt device (13) are designed as upwardly open groove tracks in substantially one joint body.

* * * * *